(12) United States Patent
Luber

(10) Patent No.: US 6,307,811 B1
(45) Date of Patent: Oct. 23, 2001

(54) METHOD FOR THE OPERATION OF SEVERAL ADJACENT ULTRASONIC SENSORS

(75) Inventor: Ernst Luber, Neukirchen (DE)

(73) Assignee: Siemens AG, Munich (DE)

( * ) Notice: Subject to any disclaimer, the term of this patent is extended or adjusted under 35 U.S.C. 154(b) by 0 days.

(21) Appl. No.: 09/675,167

(22) Filed: Sep. 29, 2000

Related U.S. Application Data

(63) Continuation of application No. PCT/DE99/00745, filed on Mar. 17, 1999.

(30) Foreign Application Priority Data

Mar. 30, 1998 (DE) ............................................... 198 14 181

(51) Int. Cl.[7] ................................. H04B 1/06; H04B 1/02
(52) U.S. Cl. ........................ 367/135; 367/137; 340/825.2
(58) Field of Search ................................... 367/135, 137, 367/153; 340/870.14, 825.14, 825.2

(56) References Cited

U.S. PATENT DOCUMENTS

| 4,779,240 | 10/1988 | Dorr | 367/96 |
|---|---|---|---|
| 4,974,072 | * 11/1990 | Hasegawa | 358/80 |
| 5,355,130 | * 10/1994 | Luber | 340/870.14 |

FOREIGN PATENT DOCUMENTS

| 3701521 A1 | 8/1988 | (DE). |
|---|---|---|
| 4003775 A1 | 8/1991 | (DE). |
| 0519090 A1 | 12/1992 | (EP). |

OTHER PUBLICATIONS

Patent Abstract of Japan, vol. 010, No. 080, Komatsu KK, Oct. 31, 1985, P–441 (JP 60 218087).

* cited by examiner

*Primary Examiner*—Ian J. Lobo
(74) *Attorney, Agent, or Firm*—Sughrue, Mion, Zinn, Macpeak & Seas, PLLC

(57) ABSTRACT

In the method according to the invention, several adjacent synchronized ultrasonic sensors automatically generate a clock signal with measurement clocks (M1, M2, M3). The transmission pulses (S1, S2, S3) of three ultrasonic sensors are generated with changing transmission pulse offset (d1, d2, d3) with respect to the respective measurement clocks (M1, M2, M3). Thereby, extrinsic echo signals of adjacent ultrasonic sensors can be masked out since only these echo signals change their position relative to the transmission pulses (S1, S2, S3). In contrast, the actual sought echo signal does not change its respective position relative to the transmission pulse (S1, S2, S3).

5 Claims, 1 Drawing Sheet

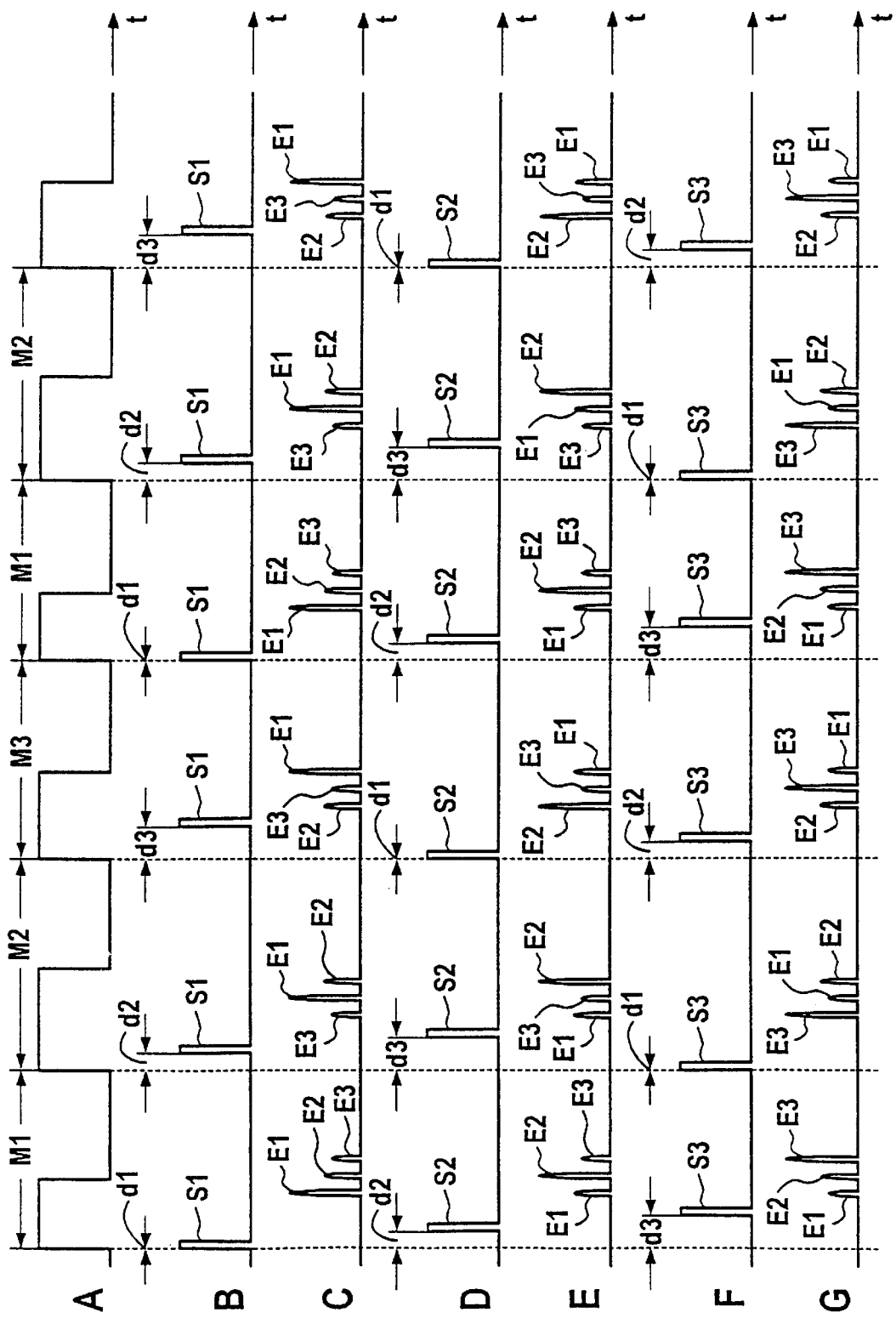

METHOD FOR THE OPERATION OF SEVERAL ADJACENT ULTRASONIC SENSORS

The following disclosure is a Continuation of International Application PCT/DE99/00745, with an international filing date of Mar. 17, 1999, the disclosure of which is incorporated into this application by reference.

FIELD OF AND BACKGROUND OF THE INVENTION

The invention relates to a method for the operation of several adjacent ultrasonic sensors which are synchronized. A first ultrasonic sensor emits first transmission pulses, a second ultrasonic sensor emits second transmission pulses, and a third ultrasonic sensor emits third transmission pulses.

A method of this type is described in European Patent Application EP 0 519 090 B1. In the operation of adjacent ultrasonic sensors, mutual influence can occur as a result of unfavorable reflections of the ultrasound in the area of the ultrasonic sensors. If the ultrasonic sensors do not transmit synchronously, the run-time measurement of an ultrasonic sensor is disturbed by the echo signal of the adjacent ultrasonic sensors. It is then possible that the echo signals will not be correctly assigned to the ultrasonic sensors which have emitted the corresponding transmission pulses. Therefore, errors occur in the run-time evaluation because the switching output is undefined. To solve this problem, it has been known in the past to operate the ultrasonic sensors serially so that the supply voltages of the ultrasonic sensors are cyclically switched on or off. The response time of the ultrasonic sensors in this technique is correspondingly lengthy. Additionally, the response time is further delayed through internal reset times. Another possibility for avoiding mutual influence, in the past, has included complying with mounting instructions, i.e., by specifying minimum distances for the installation of the ultrasonic sensors. The minimum distances, however, are very dependent on the respective application. For many potential applications, this method is not suitable, if a high degree of reliability is required. An additional solution for avoiding mutual influence includes connecting the adjacently operated ultrasonic sensors to each other through a common conductor via their release output. Through this arrangement, a parallel synchronization takes place. In this case, transmission pulses are emitted by all proximity switches at the same point in time so that the problem of correct temporal assignment of the echo signals to the appropriate ultrasonic sensors is avoided. Parallel synchronization of this type, however, has the drawback that the run-time evaluation does not contain a systematic evaluation algorithm. European Patent Application EP 0 519 090 B1 describes the connection of several ultrasonic sensors via their release outputs through a common conductor with automatic parallel or serial synchronization.

However, the sampling of rapid events, as is required, for example, for counting automobiles in the entrance to a parking garage, represents a problem which has not yet been solved.

OBJECTS OF THE INVENTION

Therefore, it is one object of the invention to provide an improved method for operating several adjacent ultrasonic sensors, such that the run-time measurement of an ultrasonic sensor can be reliably performed without disturbance of echo signals of adjacent ultrasonic sensors.

SUMMARY OF THE INVENTION

According to one formulation of the invention, this and other objects are achieved by a method for operating a plurality of adjacent ultrasonic sensors. The adjacent ultrasonic sensors are synchronized via a common conductor and the transmission pulses are emitted with changing time offset. The offset of the transmission pulses of the individual ultrasonic sensors is significantly smaller than the measuring cycle, i.e., smaller than the duration between two successive transmission pulses. As a result, a significantly higher measuring rate can be achieved than is possible with, for example, the known serial synchronization. Through the changing transmission pulse offset, the echo signals of adjacent ultrasonic sensors can be masked out through their constantly changing run-time.

The method is advantageously further developed with various added refinements. Accordingly, echo signals of several measurement cycles received by ultrasonic sensors, i.e., both their own echo signals as well as echo signals of others, are compared with each other and evaluated with respect to their position.

An especially advantageous further development of the method according to the invention is achieved by using the position of a single echo signal as a stability criterion to determine each ultrasonic sensor's sought echo signal. Therein, in successive measurement cycles, the position of the single echo signal always occurs within the same time window.

With respect to size and position, the echo signal is applied to the transmission pulse which precedes it. Only the transmission pulse's own echo signal always approximately retains the position, while as a result of the transmission pulse offset, which changes from measurement cycle to measurement cycle, the position of extrinsic echo signals changes. Thus, a simple and reliable criterion for the determination of the echo signal sought is given.

BRIEF DESCRIPTION OF THE DRAWING

The invention and further advantageous refinements of the invention according to the features of the dependent claims are explained in more detail below with the aid of a single drawing, which shows the clock signal, the transmission pulses and the received echo signals associated with the operation of three ultrasonic sensors.

DETAILED DESCRIPTION OF THE PREFERRED EMBODIMENTS

A preferred embodiment of the method according to the invention for direction-independent counting of automobiles by several adjacent ultrasonic sensors is based on the condition that ultrasonic sensors be operated so as to be synchronized. Such an operation is described, for example, in European Patent Application EP 0 519 090 B1. To this end, the ultrasonic sensors are connected with each other by a conductor. Synchronization pulses of the ultrasonic sensors overlap at least partially with respect to time, and a grounding potential is applied to the conductor as long as any synchronization signal of the ultrasonic sensors is applied. Only when the conductor assumes a voltage HIGH is it prepared for emission of new ultrasonic waves, i.e., of an emitted pulse of proximity switches. These edge changes caused by the synchronization pulses of the ultrasonic sensors result in a clock signal, the positive edges of which serve as reference time points for the emitted pulses of the ultrasonic sensors. Transmission pulses are emitted with changing offset in time with respect to the positive edges. The transmission pulse offset of the individual ultrasonic sensors is significantly smaller than the measuring cycle, i.e., than the time between two successive transmission pulses of an ultrasonic sensor. By this means, a significantly higher measuring rate can be achieved than, for example, in the case of the serial synchronization referred to at the outset. The higher measuring rate is particularly significant if rapidly moving objects are to be detected with the ultrasonic sensors. Through the changing transmission pulse offset, the echo signals of the adjacent ultrasonic sensors can be screened out by their constantly changing run-time with reference to the transmission pulse of the particular ultrasonic sensor under consideration. The ultrasonic sensors store in one measurement cycle the run-time of their own echo signal and the run-times of the adjacent ultrasonic sensors. The run-times of the echo signals of three measuring cycles are compared to each other, with only the run-time of the ultrasonic sensor's own echo signals fulfilling the specified stability criterion. This is the case if the echo signal is detected at least three times in sequence in the same time window. The location of the time window can shift depending on the measurement segment, for example between the ultrasonic sensor and the ground or between the ultrasonic sensor and a roof surface of a vehicle. The size of this time window can be specified so as to be adapted to the particular application case.

Using an example with three synchronized ultrasonic sensors, the signal curves which occur during operation are explained in accordance with the figure. The topmost signal curve A shows the clock signal automatically formed on the basis of the synchronization pulses of the individual ultrasonic sensors, as is found in detail in European Patent Application EP 0 519 090 B1. As already mentioned above, the transmission pulses of the ultrasonic sensors are emitted with changing transmission pulse offset based on the positive edges of the clock signal.

Transmission pulses S1, depicted in curve B, for the ultrasonic sensor have the transmission pulse offsets d1, d2, and d3 for measurement clocks M1, M2, and M3 of the clock signals, where in the present example d1=0 ms, d2=5 ms, and d3=10 ms. These occur in the sequence mentioned and then repeat cyclically.

Curves D and F show the position of transmission pulses S2 for the second ultrasonic sensor and S3 for the third ultrasonic sensor. Beginning with the measurement clock M1, transmission pulses S2 have the following sequence of transmission pulse offsets: d2 for measurement clock M1, d3 for measurement clock M2 and d1 for measurement clock M3 followed by cyclical repetition. Transmission pulses S3 of the third ultrasonic sensor begin with transmission pulse offset d3 for measurement clock M1, which is followed by transmission pulse offset d1 for measurement clock M2 and subsequently by transmission pulse offset d2 for measurement clock M3. In the present example, d1, d2, and d3 always have the above mentioned numerical values. The echo signals received by a particular ultrasonic sensor are recorded in the curves C, E, G assigned to the transmission pulses of the particular ultrasonic sensor. In the measurement clock M1, the first ultrasonic sensor receives its own echo signal E1 after about 15 ms. On the basis of the transmission signal offset, the first ultrasonic sensor receives after a further 5 ms or 10 ms echo signals E2 or E3 of the second or third ultrasonic sensor, respectively. In the following measurement clock M2, the sensor's own echo signal E1 occurs after 15 ms of the transmission pulse S1. Due to the transmission pulse offset, however, the echo signal E3 occurs 5 ms before the echo signal E1 and the echo signal E2 occurs 5 ms later. As a result of the transmission pulse offset in the following measurement pulse M3, a further deviating sequence of echo signals occurs with the first received echo signal E2, the echo signal E3 following after 5 ms, and the echo signal E1 following after an additional 5 ms. It is recognized that only echo signal E1 fulfills the stability criterion and occurs three times in sequence in the same time window, namely after 15 ms. In the present example, this time window, adapted to the transmission pulse offset, is smaller than 5 ms.

The transmission pulse time offset must be selected large enough so that the echo signals can be selectively detected. If the echo signal is detected at least three times in sequence in the mentioned time window, the transmitter output of the ultrasonic sensor changes its state and a count pulse is given.

As mentioned above, the position of the echo signals and the associated time windows, in which the echo signals are situated, depends on the particular measurement segment.

The echo signals E2 and E3 of the second and third ultrasonic sensors, respectively, in accordance with the curves D and F, are also compared with each other and evaluated in corresponding manner to filter out only the run-times of the sensor's own echo signals in the described manner. That is, the echo signals of adjacent ultrasonic sensors are masked out. The transmission pulse offsets for the different ultrasonic sensors can be filed under the addresses assigned to them. Thus, for example, the following assignment is possible:

Under address 1 for the first ultrasonic sensor: d1=0 ms, d2=5 ms, d3=10 ms, d1=0 ms, d2=5 ms, d3=10 ms, etc., under address 2 for the second ultrasonic sensor d2=5 ms, d3=10 ms, d1=0 ms, d2=5 ms, d3=10 ms, d1=0 ms, etc., and under address 3 for the third ultrasonic sensor d3=10 ms, d1=0 ms, d2=5 ms, d3=10 ms, d1=0 ms, d2=5 ms, etc.

In the described method, the ultrasonic sensors function independently, i.e., without additional control expense. Naturally, however, a central control of the ultrasonic sensors is also possible.

The above description of the preferred embodiments has been given by way of example. From the disclosure given, those skilled in the art will not only understand the present invention and its attendant advantages, but will also find apparent various changes and modifications to the methods disclosed. It is sought, therefore, to cover all such changes and modifications as fall within the spirit and scope of the invention, as defined by the appended claims, and equivalents thereof.

What is claimed is:

1. A method for operating several adjacent sensors in synchronism, comprising the steps of:

generating a clock signal having a first measurement clock, a second measurement clock, and a third measurement clock;

emitting a first transmission pulse sequence, a second transmission pulse sequence, and a third transmission pulse sequence from a first of the sensors, a second of the sensors, and a third of the sensors, respectively;

from the first sensor, emitting a first transmission pulse of the first sequence, a second transmission pulse of the first sequence, and a third transmission pulse of the first sequence, the first, second, and third transmission pulses of the first sequence having a first time offset, a second time offset, and a third time offset, respectively, wherein the first, the second, and the third time offsets mutually differ and occur in reference to the first, second, and third measurement clocks, respectively;

from the second sensor, emitting a first transmission pulse of the second sequence, a second transmission pulse of the second sequence, and a third transmission pulse of the second sequence, the first, second, and third transmission pulses of the second transmission pulse sequence having the second time offset, the third time offset, and the first time offset, respectively, wherein the second, the third, and the first time offsets occur in reference to the first, second, and third measurement clocks, respectively; and from the third sensor, emitting a first transmission pulse of the third sequence, a second transmission pulse of the third sequence, and a third transmission pulse of the third sequence, the first, second, and third transmission pulses of the third sequence having the third time offset, the first time offset, and the second time offset, respectively, wherein the third, the first, and the second time offset occur in reference to the first, second, and third measurement clocks, respectively.

2. The method of claim 1, wherein the third measurement clock is non-overlapping with and follows the second measurement clock, and the second measurement clock is non-overlapping with and follows the first measurement clock, and the first measurement clock is non-overlapping with and follows the third measurement clock.

3. The method of claim 1, further comprising:

at each of the first, second, and third sensors and in each of the first, second and third measurement clocks, receiving a first echo signal, a second echo signal and a third echo signal from the corresponding first, second and third transmission pulses of the first, second and third transmission pulse sequences; and comparing a position of each of the first, second, and third echo signals in each of the first, second, and third measurement clocks.

4. The method of claim 3, wherein the comparing step further comprises matching each of the first, second, and third echo signals with each of the sensors by searching for that matching echo signal of the first, second, and third echo signals in each of the first, second, and third measurement clocks that is located within a predetermined time window and that has a magnitude and a position that correspond to that transmission pulse of the respective transmission pulse sequence that generated the matching echo signal.

5. A method for operating a plurality of adjacent ultrasonic sensors, comprising:

emitting a first sequence of transmission pulses according to a predetermined clock cycle, wherein the transmission pulses are emitted within respective cycles of the clock cycle with time offsets, wherein the time offsets are respectively smaller than the clock cycles and wherein the time offsets change relative to the time offsets from preceding and subsequent ones of the clock cycles;

emitting a second sequence of transmission pulses according to the predetermined clock cycle;

wherein corresponding ones of the transmission pulses from the first and the second sequences within a single one of the clock cycles are emitted with the time offsets, wherein the time offsets for the corresponding pulses differ; and receiving echoes from the first and the second sequences of transmission pulses.

* * * * *